United States Patent [19]

Younes

[11] Patent Number: 4,800,058

[45] Date of Patent: * Jan. 24, 1989

[54] METHOD FOR THE PREPARATION OF RIGID CAST OR TRANSFER MOLDED THERMOSET POLYURETHANE MODIFIED POLYISOCYANURATE COMPOSITIONS

[75] Inventor: Usama E. Younes, Newtown Square, Pa.

[73] Assignee: Arco Chemical Company, Newtown Square, Pa.

[*] Notice: The portion of the term of this patent subsequent to Mar. 15, 2005 has been disclaimed.

[21] Appl. No.: 88,455

[22] Filed: Aug. 24, 1987

[51] Int. Cl.$^4$ .............................................. B29C 45/02
[52] U.S. Cl. .............................. 264/328.4; 264/328.6; 528/53
[58] Field of Search .......................... 264/328.4, 328.6; 528/53, 54, 73

[56] References Cited

U.S. PATENT DOCUMENTS

| | | | |
|---|---|---|---|
| 4,517,150 | 5/1985 | Harashima et al. | 264/328.6 |
| 4,540,781 | 9/1985 | Barsa | 544/222 |
| 4,565,511 | 1/1986 | Ramisch | 264/328.6 |
| 4,731,427 | 3/1988 | Younes | 264/328.6 |

FOREIGN PATENT DOCUMENTS 55-133936  10/1980  Japan ................................ 264/328.6

Primary Examiner—Jan H. Silbaugh
Assistant Examiner—Allan R. Kuhns
Attorney, Agent, or Firm—Delbert E. McCaslin

[57] ABSTRACT

A method for the preparation of cast or transfer molded rigid polyurethane modified polyisocyanurate polymer composition by conveying from a mixing chamber into a mold cavity of desired configuration to react at temperatures of from about ambient to about 140° C. a reaction mixture of an organic di- or polyisocyanate, a cyclic alkylene carbonate and a polyether polyol, in the presence of a soluble adduct of a tertiary amine and a cyclic alkylene cabonate as a catalyst.

12 Claims, No Drawings

METHOD FOR THE PREPARATION OF RIGID CAST OR TRANSFER MOLDED THERMOSET POLYURETHANE MODIFIED POLYISOCYANURATE COMPOSITIONS

RELATED APPLICATION

This application is related to Usama E. Younes application Ser. No. 07/032801 filed Apr. 1, 1987, now U.S. Pat. No. 4,731,427 issued Mar. 15, 1988, entitled Method For the Preparation of Rigid Reaction Injection Molded Thermoset Polyurethane Modified Polyisocyanurate Compositions.

FIELD OF THE INVENTION

This invention relates to a method for the preparation of rigid cast molded or transfer molded polyurethane modified polyisocyanurate thermoset polymer compositions by conveying, optionally under pressure, a reaction mixture into a mold of the desired configuration.

BACKGROUND OF THE INVENTION

The preparation of molded articles such as phenolics, melamines and silicones by cast or transfer molding is known and has become popular as a molding technique for certain parts and articles having intricate sections as well as molded inserts and those requiring close tolerances, as well as reduced mold cycle times. Generally the term transfer molding as referred to in the literature is applied to a process of forming articles in a closed mold from a thermosetting reaction mixture that is conveyed, usually under pressure, from an auxiliary chamber or pot. The various types of transfer molding known in the art are generally referred to as the pot type and include plunger molding using cams transfer molding in a compression press and screw transfer molding. Transfer molding (referred to in the trade as Resin Transfer Molding or RTM) and its various intricacies and advantages are described for example in the Plastics Engineering Handbook, 4th Edition, pp 220–240, Van Nostrand Reinhold Co. and incorporated herein by reference.

The preparation of polyisocyanurate foams using a wide variety of trimerization catalysts has been suggested and used (See, for example U.S. Pat. No. 4,033,908 and references cited therein).

U.S. Pat. Nos. 3,878,156, 3,883,466 and 3,886,102 all describe the preparation of rigid polyurethane compositions from polyether polyols, isocyanates, organic carbonates and non-amine containing metallic catalysts.

U.S. Pat. No. 4,035,331 discloses a rigid non-cellular polyurethane composition using an amine initiated polyol, an isocyanate and a liquid modifier of an organic carbonate.

U.S. Pat. No. 3,703,520 describes the preparation of an insoluble trimerization adduct catalyst of ethylene carbonate and triethylene diamine.

SUMMARY OF THE INVENTION

According to the present invention there is provided an improved method for making a rigid cast or transfer molded polyurethane modified polyisocyanurate thermoset polymer composition which comprises conveying from a mixing chamber or kettle into a mold cavity to react at ambient or elevated temperatures, a reaction mixture of an organic di-or polyisocyanate, a cyclic alkylene carbonate, a polyether polyol in the presence of a soluble amine-carbonate adduct as catalyst. With the exception of that which may be in the adduct as catalyst, cyclic alkylene carbonate may be included along with the isocyanate.

It is a primary object of this invention therefore, to provide an improved method for the preparation of a rigid polyurethane modified polyisocyanurate thermoset composition having improved properties by cast moldin9 or transfer moldin9 techniques with fast demold time.

It is another object of this invention to provide a molded product from low viscosity components which can be molded under a variety of conditions rangin9 from ambient to elevated temperatures to give a completely cured part in less than 5 seconds or delayed for up to 20 minutes where additional pot life and processing time might be required.

Another object of this invention is to provide a cast or transfer molded polyurethane modified polyisocyanurate having exceptional composite properties using high density glass mats as reinforcement.

These and other objects and advantages of this invention will become apparent from the description of the invention and from the claims.

DETAILED DESCRIPTION OF THE INVENTION

In accordance with the present invention, rigid polyurethane modified polyisocyanurate thermoset polymer compositions are prepared by cast molding or transfer molding by conveying from a mixing vessel such as a chamber, pot or kettle, into a mold cavity of desired configuration, (which mold may have the ability to be compressed) to react at temperatures of from about ambient to about 140° C. a reaction mixture of an organic di- or polyisocyanate, from about 2 to about 50 parts by weight of a cyclic alkylene carbonate, and from about 2 to about 50 parts by weight of a polyether polyol based on 100 parts of the isocyanate-carbonate-polyol composition, and in the presence of a soluble adduct of a tertiary amine and a cyclic alkylene carbonate as catalyst at a concentration of from about 0.005 to about 5.0 weight percent based on the total composition. As indicated hereinabove some of the cyclic alkylene carbonate may be included along with the isocyanate.

A wide variety of organic isocyanates including aliphatic, alicyclic and aromatic polyisocyanates may be employed in the instant invention and are characterized by containing two or more isocyanate (NCO) groups per molecule. Typical organic di or polyisocyanates include p-phenylene diisocyanate, polymethylene polyphenyl isocyanate, toluene-2, 4- and 2,6-diisocyanate or mixtures thereof, diansidine diisocyanate, hexamethylene diisocyanate, naphthalene-1, 4-diisocyanate, octylene-1, 8-diisocyanate, 4,4'-diphenylpropane diisocyanate 3,3'- dimethyl diphenylmethane-4, 4'-diisocyanate, triphenylmethane triisocyanate, 3,3'-ditolylene-4,4'-diisocyanate, 4-chloro-1, 3-phenylene diisocyanate 1,4-, 1,3-and 1,2-cyclohexylene diisocyanate and in general the isocyanates disclosed in U.S. Pat. No. 3,577,358. Mixtures of polyisocyanates may be used which for example are the crude mixtures of di and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The organic polyisocyanates may be isocyanate-ended pre-polymers made by reacting under standard known conditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or poly glycols partially esterfied with carboxylic acids including polyester polyols and polyether polyols. Known processes for the preparation of polyamines and corresponding methyleee bridged polyphenyl polyisocyanates therefrom are disclosed in the literature and in many patents; for example U.S. Pat. Nos. 2,683,730, 2,950,263, 3,012,008, 3,334,162 and 3,362,979. The isocyanates may contain impurities or additives such as the carbodiimides or uretonimine modified MDI products. The preferred polyisocyanates are the diphenylisomer and the higher functional polyisocyanate polymethylene polyphenyl isocyanate mixtures, which may contain from about 20 to about 85 weight percent of the diphenylmethane diisocyanate isomers. In general the organic isocyanates will have a molecular weight in the range of between about 100 and about 10,000. Typical of the preferred polyisocyanates are those sold commercially as "Isonate 143-L" and "Isonate 181" by the Dow Chemical Company a carbodiimide modified diphenylmethane diisocyanates and an ethylene glycol capped isocyanate prepolymer having 22.9% NCO respectively, "Rubinate LF168" and "Rubinate LF179" (Rubicon Chemical Inc.) and similar diisocyanates. The amount of isocyanate employed in the cast or transfer molding process will be from about 95 to about 50 and preferably from about 80 to about 65 parts by weight based on the isocyanate-alkylene carbonate polyol ingredients in the react mixture.

The cyclic alkylene carbonates employed in the present invention in amounts of from about 2 to about 50 preferably from about 10 to about 25 parts by weight based on the isocyanate-carbonate-polyol composition have the general formula:

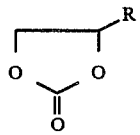

wherein R is hydrogen, $CH_3$, $C_2H_5$ or $C_3$ to $C_{10}$ hydrocarbons. Typical cyclic alkylene carbonates include, for example, ethylene carbonate, propylene carbonate, butylene carbonate styrene carbonate and octylene caronate, mixtures thereof and the like. Liquid alkylene carbonates are preferred, however, solid or semi-solid carbonates may be used if liquified with other liquid alkylene carbonates or by the reaction temperature at which they are employed. Propylene carbonate is the preferred cyclic alkylene carbonate.

The polyether polyols or mixtures of polyether polyols employed in the present invention in amounts of from about 2 to about 50 and preferably from about 10 to about 25 parts by weight based on 100 parts of the isocyanate-carbonate-polyol composition are the polyoxyalkylene polyols and include those having from 2 to about 10 hydroxyl groups. Such polyether polyols and methods for their preparation are described in "Polyurethanes: Chemistry and Technology" by Saunders and Frisch Interscience Publishers, 1964. Particularly suitable polyether polyols include those having molecular weights of from about 200 to about 10,000 or higher and preferably molecular weights of from about 2000 to about 8000 and prepared by reacting an initiator compound having 2 to about 8 hydroxyl groups with an alkylene oxide or mixtures of such oxides. Suitable initiator compounds include, for example, ethylene glycol, propylene glycol, water, dipropylene glycol, trimethylene glycol, 1,2-, 1,3- and 1,4-butanediol, glycerol, 1,2,6-hexanetriol, trimethylolethane, trimethylol propane, pentaerythritol, sorbitol, sucrose and the like. The alkylene oxides suitable for use include ethylene oxide, propylene oxide, 1,2- and 2,3-butylene oxide, styrene oxide, epichlorohydrin, epibromohydrin and mixtures thereof, etc. The polyether polyols may be diols or triols, as well as capped diols or triols or mixtures thereof. Amine or hydroxyl terminated polybutadiene may also be employed. Chain extenders or mixtures thereof may also be employed along with the polyether polyols in the total formulation. Such chain extenders include mixtures of difunctional and trifunctional chain extenders. Typical known chain extenders which may be used include diols, amino alchohols and diamines or mixtures thereof The catalysts employed in the instant invention in concentrations of from about 0.005 to about 5.0 and preferably about 0.008 to about 1.0 weight percent based on the total composition, for the formation of the cast or transfer molded polyurethane modified polyisocyanurate polymer are trimeriization catalysts and are soluble complex adducts of the reaction of a tertiary amine and the cyclic alkylene carbonates as set forth hereinabove. The preferred catalyst is an adduct of triethylene diamine (DABCO) and propylene carbonate. In order for the catalysts of the instant invention to provide optimum molding results, i.e., catalyze the cast or transfer molding reaction in 2 minutes or less, they should be essentially reacted for periods of from about 1 hour to about 90 days which time period will be dependent on the given catalyst concentration and temperature during reaction. Reaction at ambient temperatures may be employed and would generally be about 12 hours at, for example, a concentration of about 0.5 weight percent. Lesser periods would be realized at higher temperatures, e.g. about 40° C. to about 120° C. and/or at increased concentrations.

Although not essential to the practice of this invention, the use of commonly known additives which may enhance color or properties of the polyurethane modified polyisocyanurate polymer may be used if desired. For example, reinforcing materials which may be in powder, granular or long fiber form such as chopped or milled glass fibers, as well as woven, braided, knitted or stitched glass fibers, chopped or milled carbon fibers, silicon fibers, synthetic fibers such as nylon or "Kevlar", polyethylene or polypropylene fibers or strands, natural fibers of wool or cotton, cellulosic particles or fibers, etc. may be used.

Woven, knitted, pressed and felted or non-woven mats of the fibers may be employed. As indicated hereinabove, exceptional properties are obtained with the process using high density glass mats. The polyisocyanurate polymer compositions of the present invention are essentially non-cellular rigid composites. However, due to the possibility of small amounts of water being present in the reaction components i.e., polyisocyanate and alkylene carbonate as well as the adduct catalyst, the composition may contain small or micro cells in the cured polymer.

Although excellent mold release is obtained with the cast or transfer molding formulations of the instant invention alone, external or internal mold release agents such as, for example, the dimethyl siloxanes with organic acid groups may be employed.

The present invention is more fully illustrated by the following examples, which include particular features of the invention. However, the examples are not to be construed as limiting the invention in any way, it being understood that numerous variations are possible without departing from the spirit and scope of the invention.

EXAMPLE 1

Preparation of a Soluble Tertiary Amine-Propylene Carbonate Adduct Catalyst as Used in the Instant Invention 3995 gm of propylene carbonate ("ARCONATE" 5000 sold by Arco Chemical division of Atlantic Richfield Co.) was dried by passing it through a bed of activated alumina. 40.35 gm of triethylene diamine was added to the propylene carbonate with mixing at 80° C. for 112.5 hours (to react the mixture and form the adduct) at which time the mixture turned into a dark brown catalyst solution.

EXAMPLE 2

The following examples describe the preparation of a polyurethane modified polyisocyanurate composition employing a carbodiimide modified diphenylmethane diisocyanate ("Isocyanate 143L" sold commercially by Dow Chemical Co,) and polyol "Niax E351" a polyether polyol which is a capped diol comprising ethylene oxide adducts of polyoxypropylene diol containing primary hydroxyl groups.

800 gms of "Isonate-143L" were mixed with 200 gms of "Niax E351" and 1 drop of dibutyl tin dilaurate and the solution stirred for 16 hours at room temperature of approximately 25° C. 280 gms of the isocyanate-polyol solution, 104.0 gms of propylene carbonate and 16.0 gms of the catalyst solution of Example 1 were mixed at room temperature (26° C.) and poured into a 6.5×9.5×0.1 inch brass mold containing 36% glass consisting of one 3 oz. layer and one 1.5 oz. layer of fiber glass mats (Owens Corning M8610) to fill the mold. The mold was placed in a preheated (82° C.) hydraulic press and allowed to react and cure for 30 minutes under 450 psi pressure. The mold was cooled in the press for 10 minutes, removed and the molded polyurethane modified polyisocyanurate cut for testing. "Instron" testing of the material gave an Izod impact strength of 14.5 ft-lbs/in., a tensile strength of 15510 psi, % elongation of 4.0 and a flex strength and flex modulus of 18682 psi and 755220 psi respectively.

EXAMPLE 3

The procedure of Example 2 was repeated using the same amounts of isocyanate, propylene carbonate and polyol except that a glycol modified diphenylmethane diisocyanate was employed ("Isonate-181") along with a catalyst cencentration of 0.02%. Testing of the resulting molded polyurethane modified polyisocyanurate gave an Izod impact strength of 14.8 ft-lbs/in., tensile strength of 14652 psi, elogation of 4.2%, a flex strength of 19989 psi and a flex modulus of 790110 psi.

EXAMPLE 4–5

The following example describes the preparation of a molded polyurethane modified polyisocyanurate using 70% of an 80 percent to 20 percent mixture of "Isonate 143L" diphenylmethane diisocyanate and "Niax E351" a polyether polyol respectively along with 30% propylene carbonate and a catalyst concentration (Example 1 catalyst) of 0.03% in the absence of glass reinforcement. The reaction mixture was prepared as in Example 2 and poured into 6.5×9.5×0.1 inch brass molds to fill the molds which were allowed to react and cure for 30 minutes at 100° C. without pressure. The mold was cooled and the composite removed and cut for testing. The physical properties are shown in Table 1.

TABLE 1

| Example No. | 4 | 5 |
|---|---|---|
| Notched Izod Impact (ft-lbs/in) | 0.30 | 0.35 |
| Tensile Strength (psi) | 4049 | 4210 |
| Elongation % | 7.5 | 6.7 |
| Flex Strength (psi) | 4629 | 4899 |
| Flex Modulus (psi) | 133810 | 146880 |

EXAMPLE 6

Examples 4–5 was repeated employing 70% of a 60% isocyanate ("Isonate 143L") and 40% polyether polyol ("Niax E351") mixture with 30% propylene carbonate at a catalyst concentration of 0.03%. The filled mold was allowed to react and cure for 30° minutes at 80° C. and then cooled and the composite removed and cut for testing. Testing of the resulting molded polyurethane modified polyisocyanurate gave an Izod impact of 0.29 ft-lbs/in. a tensile strength of 1758 psi, % elongation of 11.4, flex strength of 1439 psi and a flex modulus of 45202.

EXAMPLE 7–8

Example 7 describes the preparation of a molded polyurethane modified polyisocyanurate using 80% of a 80 percent to 20 percent mixture of "Isonate 181" isocyanate and "Niax E351" polyether polyol respectively. Example 8 employes 80% of a 60 percent to 40 percent mixture of "Isonate 181"and "Niax E351" respectively. Both mixtures were reacted with 20% propylene carbonate in the presence of the catalyst of Example 1 at a concentration of 0.02%. The reaction mixtures were prepared as in Examples 4–5 in the absence of glass mats. The filled molds were allowed to react and cure for 30 minutes at 80° C. without pressure. Testing of the polyurethane modified polyisocyanurate composite gave the physical properties shown in Table 2.

TABLE 2

| Example No. | 7 | 8 |
|---|---|---|
| Notched Izod Impact (ft-lbs/in.) | 0.39 | 0.37 |
| Tensile Strength | 6428 | 2971 |
| Elongation % | 4.6 | 7.5 |
| Flex Strength (psi) | 8007 | 2930 |
| Flex Modulus (psi) | 219140 | 79713 |

I claim:

1. A method for the preparation of a rigid cast or transfer molded polyurethane modified polyisocyanurate thermoset polymer composition which comprises conveying from a mixing chamber into a mold cavity of the desired configuration, which may be compressed,to react at temperatures of from about ambient to about 140° C. a reaction mixture of an organic di- or polyisocyanate, from about 2 to about 50 parts by weight of a cyclic alkylene carbonate, and from about 2 to about 50 parts by weight of a polyether polyol, based on 100 parts of the isocyanate-carbonate-polyol composition, in the presence of a soluble adduct of a tertiary amine and a cyclic alkylene carbonate as catalyst at a concentration of from about 0.005 to about 5.0 weight percent based on the total composition.

2. A method according to claim 1 wherein the cyclic alkylene carbonate is employed in amounts of from about 10 to about 25 parts by weight.

3. A method according to claim 1 wherein the polyether polyol is employed in amounts of from about 10 to about 25 parts by weight.

4. A method according to claim 1 wherein the adduct catalyst is employed at a concentration of from about 0.008 to about 1.0 weight percent.

5. A method according to claim 1 wherein the organic di- or polyisocyanate is diphenylmethane diisocyanate.

6. A method according to claim 5 wherein the diphenylmethane diisocyanate is carbodiimide modified.

7. A method according to claim 5 wherein the diphenylmethane diisocyanate is glycol modified.

8. A method according to claim 1 wherein the alkylene carbonate is propylene carbonate.

9. A method according to claim 1 wherein the soluble adduct is a reaction complex of triethylene diamine and propylene carbonate.

10. A method according to claim 1 wherein the adduct is formed by reacting and aging the tertiary amine and cyclic alkylene carbonate for a time sufficient to form an effective catalyst concentration of the adduct.

11. A method according to claim 1 wherein the polyurethane modified polyisocyanurate reaction mixture is molded into glass fiber mats.

12. A method for the preparation of a rigid cast or transfer molded polyurethane modified polyisocyanurate thermoset polymer composition which comprises conveying from a mixing chamber into a mold cavity of the desired configuration, which may be compressed, to react at temperatures of from about ambient to about 140° C. a reaction mixture of diphenylmethane diisocyanate, from about 10 to about 25 parts by weight of propylene carbonate and from about 10 to about 25 parts by weight of a polyether polyol, based on 100 parts of the isocyanate-carbonate-polyol composition, in the presence of a soluble adduct of triethylene diamine and propylene carbonate as catalyst at a concentration of from about 0.008 to about 1.0 weight percent based on the total composition.

* * * * *